US010501155B2

(12) United States Patent
Firmin (10) Patent No.: US 10,501,155 B2
(45) Date of Patent: Dec. 10, 2019

(54) REMOTELY-CONTROLLED OBSERVATION VEHICLE FOR OBSERVING SWIMMERS

(71) Applicant: Ocula Corporation, Kensington, CA (US)

(72) Inventor: Robert L Firmin, Kensington, CA (US)

(73) Assignee: Ocula Corporation, Kensington, CA (US)

( * ) Notice: Subject to any disclaimer, the term of this patent is extended or adjusted under 35 U.S.C. 154(b) by 0 days.

(21) Appl. No.: 16/223,749

(22) Filed: Dec. 18, 2018

(65) Prior Publication Data

US 2019/0187712 A1    Jun. 20, 2019

Related U.S. Application Data

(60) Provisional application No. 62/607,909, filed on Dec. 19, 2017.

(51) Int. Cl.
*B63B 35/00*   (2006.01)
*G05D 1/02*    (2006.01)
(Continued)

(52) U.S. Cl.
CPC .............. *B63B 35/00* (2013.01); *B63B 39/06* (2013.01); *B63B 49/00* (2013.01); *G05D 1/0206* (2013.01);
(Continued)

(58) Field of Classification Search
CPC .. G05D 1/0206; G05D 1/0011; G05D 1/0038; B63B 35/00; B63B 2035/006;
(Continued)

(56) References Cited

U.S. PATENT DOCUMENTS

| 7,337,462 B2 | 2/2008 | Dukiewicz et al. |
| 2005/0204992 A1 | 9/2005 | Shelton et al. |

(Continued)

FOREIGN PATENT DOCUMENTS

| CN | 206674087 U | 11/2017 |
| FR | 3008378 A1 | 1/2015 |

OTHER PUBLICATIONS

American Movie Co., "Aerial Video/Drones", accessed Aug. 14, 2017, https://www.americanmovieco.com/video-production/aerialdrone-video/ (Year: 2017).*

(Continued)

*Primary Examiner* — Spencer D Patton
(74) *Attorney, Agent, or Firm* — United IP Counselors, LLC (57) ABSTRACT

A remotely-controlled observation vehicle for observing swimmers is disclosed. The vehicle is designed to float and move on the water, and includes a hull, which is typically sealed. An above-water camera mount is attached to the hull and extends upwardly from it. The above-water camera mount carries one or more cameras. A below-water camera mount is attached to the hull and extends downwardly from it. The below-water camera mount also carries one or more cameras. A first propulsion system is adapted to drive the vehicle through water, and a first steering system is associated with the first propulsion system. The observation vehicle also includes communication and control systems. The vehicle may be fore-aft symmetrical, with a propulsion system and a steering system disposed proximate to each end of the hull. Also disclosed is a system including a vehicle with an associated controller and a data review station.

19 Claims, 5 Drawing Sheets

(51) Int. Cl.
*B63B 39/06* (2006.01)
*B63B 49/00* (2006.01)
*B63H 25/06* (2006.01)
*G05D 1/00* (2006.01)

(52) U.S. Cl.
CPC ..... *B63B 2035/008* (2013.01); *B63B 2203/00* (2013.01); *B63B 2211/00* (2013.01); *B63H 2025/063* (2013.01); *B63H 2025/066* (2013.01); *G05D 1/0038* (2013.01)

(58) Field of Classification Search
CPC ........ B63B 2035/007; B63B 2035/008; B63B 2035/737; B63B 2015/0033; B63B 3/46; B63B 3/70; B63B 15/02; B63B 2017/0054; B63B 2017/0063; B63B 49/00; B63B 2727/02
See application file for complete search history.

(56) References Cited

U.S. PATENT DOCUMENTS

| | | |
|---|---|---|
| 2013/0016588 A1 | 1/2013 | O'Dell |
| 2014/0090288 A1* | 4/2014 | Freeman ................. B63B 35/14 |
| | | 43/26.1 |
| 2016/0023725 A1 | 1/2016 | Hine et al. |
| 2017/0227639 A1 | 8/2017 | Stokes et al. |
| 2017/0240258 A1 | 8/2017 | Gasparoni et al. |
| 2017/0291670 A1* | 10/2017 | Johnson .................. B63B 35/00 |
| 2018/0068416 A1* | 3/2018 | Chandra ............... B64C 39/024 |
| 2018/0204474 A1 | 7/2018 | Firmin |

OTHER PUBLICATIONS

International Search Report and Written Opinion of the ISA issued in corresponding International Patent Application No. PCT/US2018/066188 dated Mar. 5, 2019, 9 pages.

* cited by examiner

REMOTELY-CONTROLLED OBSERVATION VEHICLE FOR OBSERVING SWIMMERS

CROSS-REFERENCE TO RELATED APPLICATIONS

This application claims priority to U.S. Provisional Patent Application No. 62/607,909, filed Dec. 19, 2017. The contents of that application are incorporated by reference in their entirety.

BACKGROUND OF THE INVENTION

1. Field of the Invention

In general, the invention relates to observation and training devices for sport training, and more particularly to a remotely-controlled video vehicle for swim observation and training.

2. Description of Related Art

Video recordings of athletes are used in many sports to improve athletic performance by allowing athletes and coaches to see, and thus analyze and improve, details of biomechanics and technique. In some cases, a particular movement occurs too quickly for the human eye to perceive and thus can only be captured and revealed by video recordings; in other cases, multiple cameras trained on an athlete can give the athlete or coach perspective that is not possible to obtain with the eye alone—especially from the pool deck or from a small number of underwater perspectives. For example, a particular motion may be the result of a chain or sequence of body movements, and only with multiple video recordings from different perspectives, moving in synch with the swimmer, is it possible to observe the entire sequence.

With many kinds of sports, it is possible to place multiple stationary cameras and achieve satisfactory results. However, swimming poses particular problems. Swimmers are underwater, a difficult environment for electronics of any sort, and are not readily accessible from all angles. Traditional approaches for taking video of swimmers include having a person run alongside the pool with a camera, running a camera track on one side of the pool, and placing stationary cameras around the pool. None of these approaches are entirely satisfactory: a track camera on the side of the pool offers only a side view of the swimmer, and depending on their positioning, stationary cameras may only provide relatively brief glimpses of a passing, approaching or departing swimmer. Even if the camera perspective itself is useful, the operator may not be able to keep perfect or steady pace with the swimmer, thus negating the camera's effectiveness.

SUMMARY OF THE INVENTION

One aspect of the invention relates to a remotely-controlled observation vehicle for observing swimmers. The vehicle is designed to float and move on the water, and includes a hull, which is typically sealed. An above-water camera mount is attached to the hull and extends upwardly from it. The above-water camera mount carries one or more cameras. A below-water camera mount is attached to the hull and extends downwardly from it. The below-water camera mount also carries one or more cameras. A first propulsion system is adapted to drive the vehicle through water, and a first steering system is associated with the first propulsion system. A communications system within the vehicle is adapted to (1) receive control signals relating to speed and direction of the vehicle, and (2) transmit image or video data from the one or more above-water cameras and the one or more below-water cameras. A control unit within the vehicle is adapted to control the first propulsion system and the first steering system in accordance with the control signals and to control transmission of the image or video data.

Another aspect of the invention also relates to a remotely-controlled observation vehicle for observing swimmers. The vehicle is designed to float and move on the water, and includes a hull, which is typically sealed. The hull is symmetrical about a transverse midline of the vehicle. An above-water camera mount is attached to the hull and extends upwardly from it. The above-water camera mount carries one or more cameras. A below-water camera mount is attached to the hull and extends downwardly from it. The below-water camera mount also carries one or more cameras.

The observation vehicle according to this aspect of the invention also has first and second propulsion systems attached to the hull proximate to the first and second ends, respectively, symmetrically about the transverse midline of the hull. The first and second propulsion systems are adapted to drive the vehicle through water. First and second steering systems are also attached to the hull symmetrically about the transverse midline of the hull in association with the first and second propulsion systems, respectively. A communications system within the vehicle is adapted to (1) receive control signals relating to speed and direction of the vehicle, and (2) transmit image or video data from the one or more above-water cameras and the one or more below-water cameras. A control unit within the vehicle is adapted to control the first and second propulsion systems and the first and second steering systems in accordance with the control signals and to control transmission of the image or video data.

Yet another aspect of the invention relates to a system for observing swimmers. The system comprises a remotely-controlled observation vehicle, a controller, and a data review station. The observation vehicle has the features described above. The controller is adapted to provide control signals relating to the speed and the direction of the vehicle to the communications system of the vehicle; and the data review station is adapted to receive the image or video data. In some embodiments, the data review station is equipped to allow a coach, or another interested individual, to review the image or video data in real time, optionally overlaid with data received or derived from the observation vehicle.

Other aspects, features, and advantages of the invention will be set forth in the description that follows.

BRIEF DESCRIPTION OF THE DRAWING FIGURES

The invention will be described with respect to the following drawing figures, in which like elements are indicated by like numerals throughout the drawing figures, and in which.

DETAILED DESCRIPTION

Figure 1:
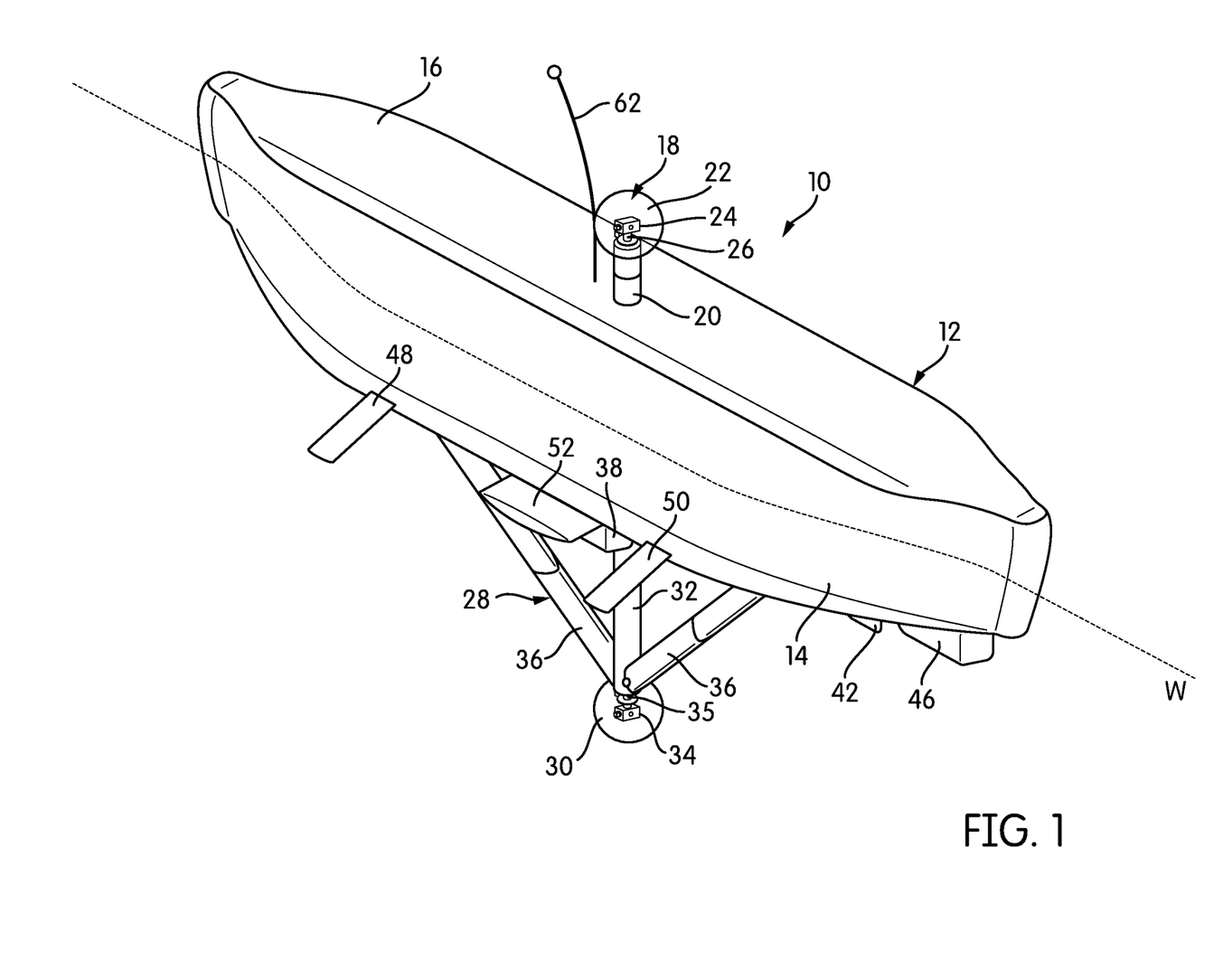
FIG. 1 is a perspective view of a remotely-controlled video vehicle according to one embodiment of the invention.
Figure 2:
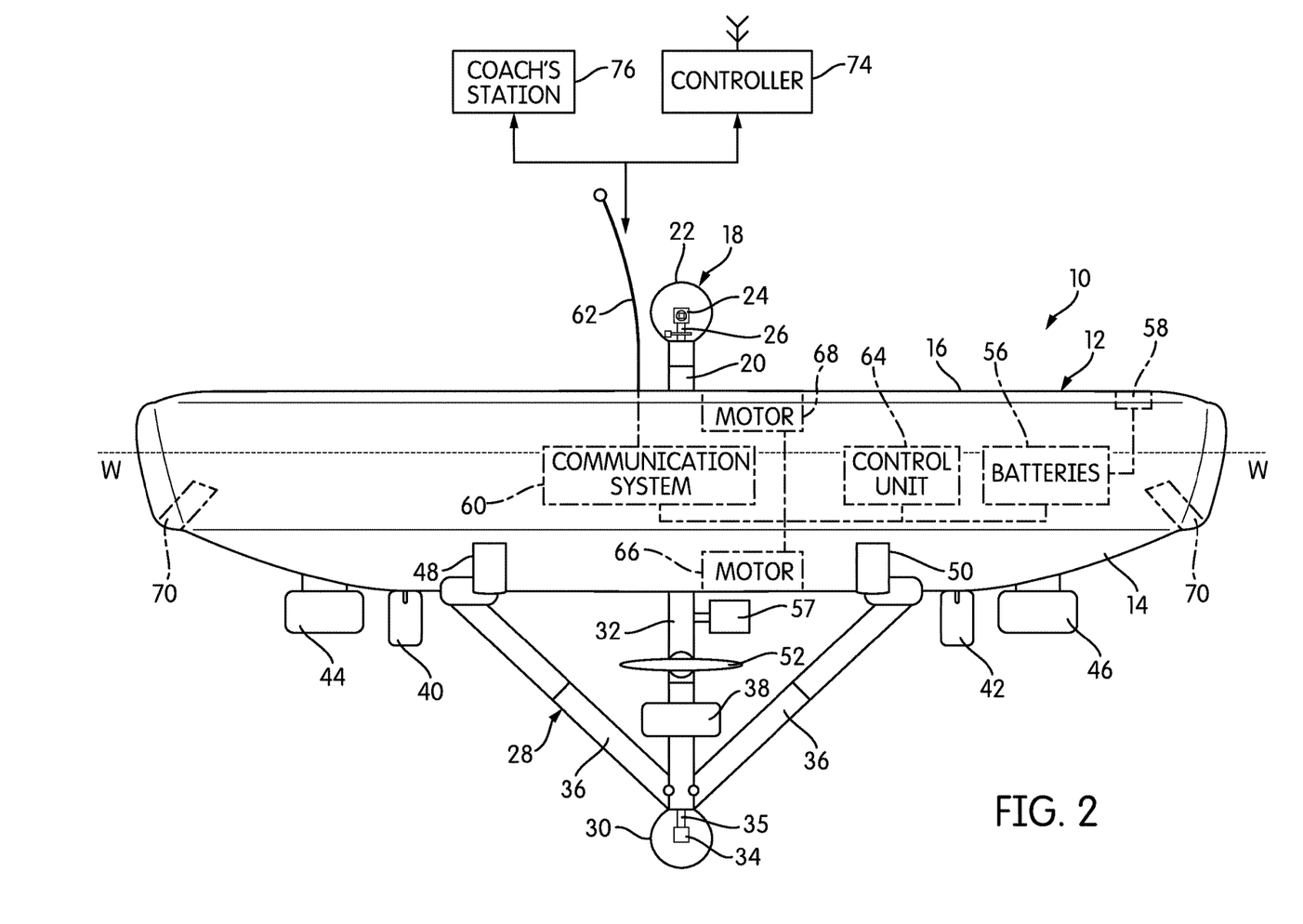
FIG. 2 is a side elevational view of the vehicle of FIG. 1.

FIG. 1 is a perspective view of a remotely-controlled observation vehicle for observing swimmers, generally indicated at 10, according to one embodiment of the invention, and FIG. 2 is a side-elevational view of the vehicle 10. The vehicle 10 is designed to provide video and, if desired, still images from multiple cameras and perspectives while moving with a swimmer in the water.

The vehicle 10 is buoyant and, in operation, floats in the water in which a swimmer is swimming. Typically, the vehicle 10 will be used in a swimming pool, although the vehicle 10 may also be used in natural bodies of water, such as lakes and oceans. The body 12 of the vehicle 10 includes a hydrodynamic hull 14, a portion of which extends below the water line W. The body 12 of the vehicle 10 also includes an upper portion 16. The hull 14 and the upper portion 16 are typically either made as one piece or joined together such that the body 12 is sealed against ingress of water and other foreign materials. The body 12 may, for example, have an ingress protection (IP) rating of 68. In practical terms, although the vehicle 10 is buoyant, it is helpful if the vehicle 10 and its body 12 can be completely submerged for at least brief periods without damage. The hull 14 and the upper portion 16 may be made from any number of materials, including plastics; glass-fiber and other composites; and metals, although metals that corrode or rust may need to be painted or otherwise treated. Beyond water resistance, it is helpful if the material of which the hull 14 and upper portion 16 are made is resistant to chlorinated water, brominated water, salt water, and other common chemicals found in swimming pools and other bodies of water in which the vehicle 10 is to be used.

The particular shape of the body 12 of the vehicle 10 may vary from embodiment to embodiment, although most embodiments of the body 12 and its hull 14 would be configured and adapted to maintain stability in pitch, roll, and yaw under the water conditions expected during competitive swimming practices and events. For example, some embodiments may be designed for greater stability in the relatively still waters of a swimming pool, while other embodiments may be designed for relatively rougher outdoor waters. However, regardless of the precise features that are present in any one embodiment, one commonality between embodiments is that the body 12 of the vehicle 10 and its systems are designed for safe operation in close proximity with swimmers. For example, the fore and aft ends of the hull 14 are both blunt, and may be padded with soft or elastic material. Additionally, as will be described below in more detail, moving propulsion elements are shrouded to prevent human contact, and exposed control surfaces have rounded or blunted edges.

The vehicle 10 of the illustrated embodiment carries at least two video cameras mounted in separate positions, and may also carry a suite of other sensors, as will be described below in more detail. An above-water camera mount 18 carries one or more video cameras and is located atop the upper portion 16 centered amidships, i.e., centered at approximately the longitudinal mid-point of the vehicle 10. The camera mount 18 includes a strut 20 that extends upwardly from the upper portion 16, on top of which is an observation pod 22 in which one or more cameras are mounted.

The strut 20 may either be of a fixed height or it may be telescoping, so as to adjust to a variety of heights. If the strut 20 does telescope, may be motorized so as to be remotely controlled, or it may telescope and have its height set manually before use. The strut 20 is round, which may provide some streamlining and reduce air resistance and drag as the vehicle 10 moves. However, the strut 20 may have any shape, vaned, square, rectangular, or otherwise, in order to improve either its mechanical stability or its aerodynamics.

The observation pod 22 would typically be made of an optically transparent plastic material, such as clear polycarbonate, poly(methylmethacrylate) (PMMA) or poly(ethylene terephthalate) (PET). However, if the camera or cameras perceive wavelengths outside of the visible spectrum, the material of which the observation pod 22 is made would typically be transparent to those wavelengths as well. The observation pod 22 itself is liquid-tight to protect its contents, and like other components of the vehicle, it is resistant to the environment in which it is placed.

Within the observation pod 22, one or more cameras 24 are mounted on a mount 26 that allows the cameras 24 to be panned (i.e., rotated horizontally) or tilted. That mount 26 may be a gimbal mount, which would allow the cameras 24 to remain trained on a particular position even if the vehicle 10 is rolling or pitching. In some embodiments, the mount 26 may be motorized and remotely controlled, while in others, it may be manually adjustable, for example, before a swim session begins or between swimmers, and fixed while in operation. Other types of camera movements may be permitted as well.

Attached to the hull 14 and extending under the waterline W is an underwater camera mount 28. In the illustrated embodiment, the underwater camera mount 28 is directly beneath the above-water camera mount 18, such that the two camera mounts 18, 28 extend along the same vertical axis. However, the underwater camera mount 28 may be placed in other locations as well. Like the above-water camera mount 18, the underwater camera mount 28 includes an observation pod 30 mounted on the end of a vertical strut 32.

The observation pod 30 and the one or more cameras 34 that are mounted in it may be functionally the same as the cameras 24 that are used in the above water, or they may be different. The one or more cameras 34 are mounted on a mount 35 that may be motorized and remotely controllable, or that may be set manually to a particular position prior to use, between swimmers, or between laps, and then fixed in position during operation. Typically, the mount 35 would allow the one or more cameras 34 to tilt and pan, although other types of camera movements may be permitted as well. The mount 35 may be a gimbal mount, which would allow the cameras 34 to remain trained on a particular position even if the vehicle 10 is rolling or pitching.

The strut 32 telescopes. The strut 32 may be operationally connected to a motor or motors to telescope under remote control. However, in some embodiments, the strut 32 may be telescoped manually and then fixed in position before use.

As was described above, the above-water camera mount 18 may create some air resistance as the vehicle 10 moves. Similarly, the underwater camera mount 28 may create some hydrodynamic (i.e., water) resistance or drag as the vehicle moves. Thus, the underwater camera mount 28 includes several features that may either reduce hydrodynamic resistance and drag forces or increase the overall stability of the camera mount 28. First, the camera mount 28 includes two telescoping support struts 36 that are pivotally mounted on the hull 14 fore and aft of the main strut 32 and connect with the strut 32 at its distal extent, just above the observation pod 30 in which the camera 34 or cameras 34 are mounted. The two support struts 36 and their mounts are mirror images of one another. The main strut 32 and the support struts 36 have a round cross-section in the illustrated embodiment, but may have any other shape in order to resist hydrodynamic forces and drag.

Figure 3:
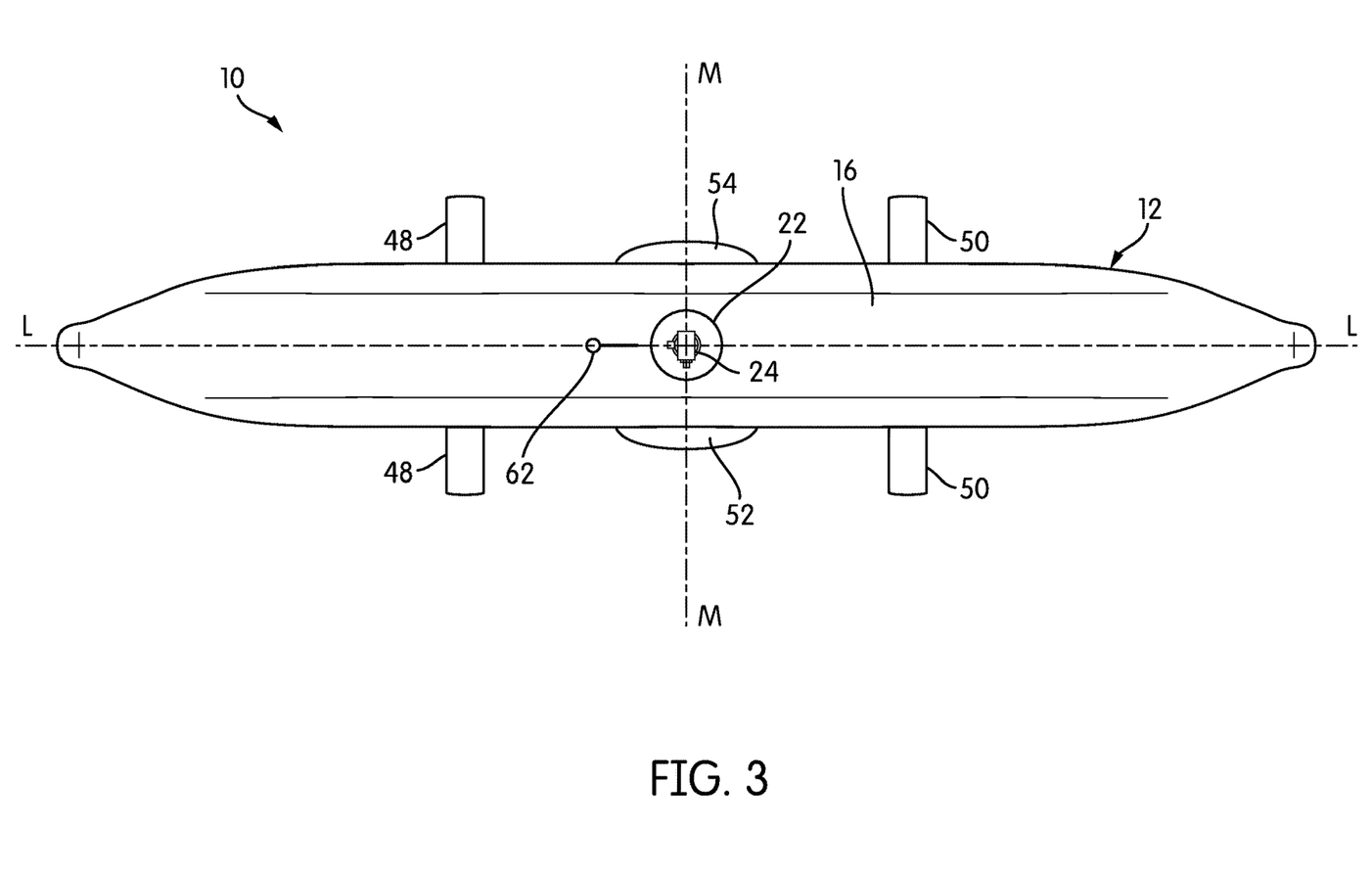
FIG. 3 is a top plan view of the vehicle of FIG. 1.

The support struts 36 are positioned to resist hydrodynamic drag forces in the typical directions of travel. In use, the vehicle 10 will typically move along the length of a swimming pool, oriented so that the direction of travel aligns with the fore-aft longitudinal axis of the vehicle 10. (The longitudinal axis of the vehicle is indicated by line L-L in the top plan view of FIG. 3.) Therefore, the support struts 34 are positioned to resist forces encountered when traveling in those directions. If the vehicle 10 is used in other environments or for other purposes, the positions of the struts 34 could be changed, or additional support struts could be added in other positions. Additionally, the struts 34 act like a deep keel for overall roll stability of the vehicle 10.

In addition to the support struts 34, some embodiments of the vehicle 10 may optionally include active devices to balance drag forces. As shown in FIGS. 1 and 2, a pair of small fluid thrusters 38 is mounted on the main strut 32 of the underwater camera mount 28. These fluid thrusters 38 are independently driven, typically by small electric motors, and may be used intermittently or continuously to balance or counteract any effects that the underwater camera mount 28 or other structures may have on the course or speed of the vehicle 10. In essence, the small fluid thrusters 38 serve as a kind of trim system for the vehicle 10. Thus, while the fluid thrusters 38 may contribute to the propulsion of the vehicle 10, they may also serve, e.g., to prevent the vehicle 10 from pitching forward in response to underwater drag forces.

The fluid thrusters 38 may be direct-drive systems, in which the motor is connected directly to the propeller, impeller, rotor, or other such drive element, or they may have a drive train connected between the motor and the drive element. If a drive train is present, it may act to reduce the rotational speed of the motor and to control the torque applied to the drive element. In other embodiments, there may be only one fluid thruster 38, mounted closer to the centerline of the vehicle 10.

Figure 4:
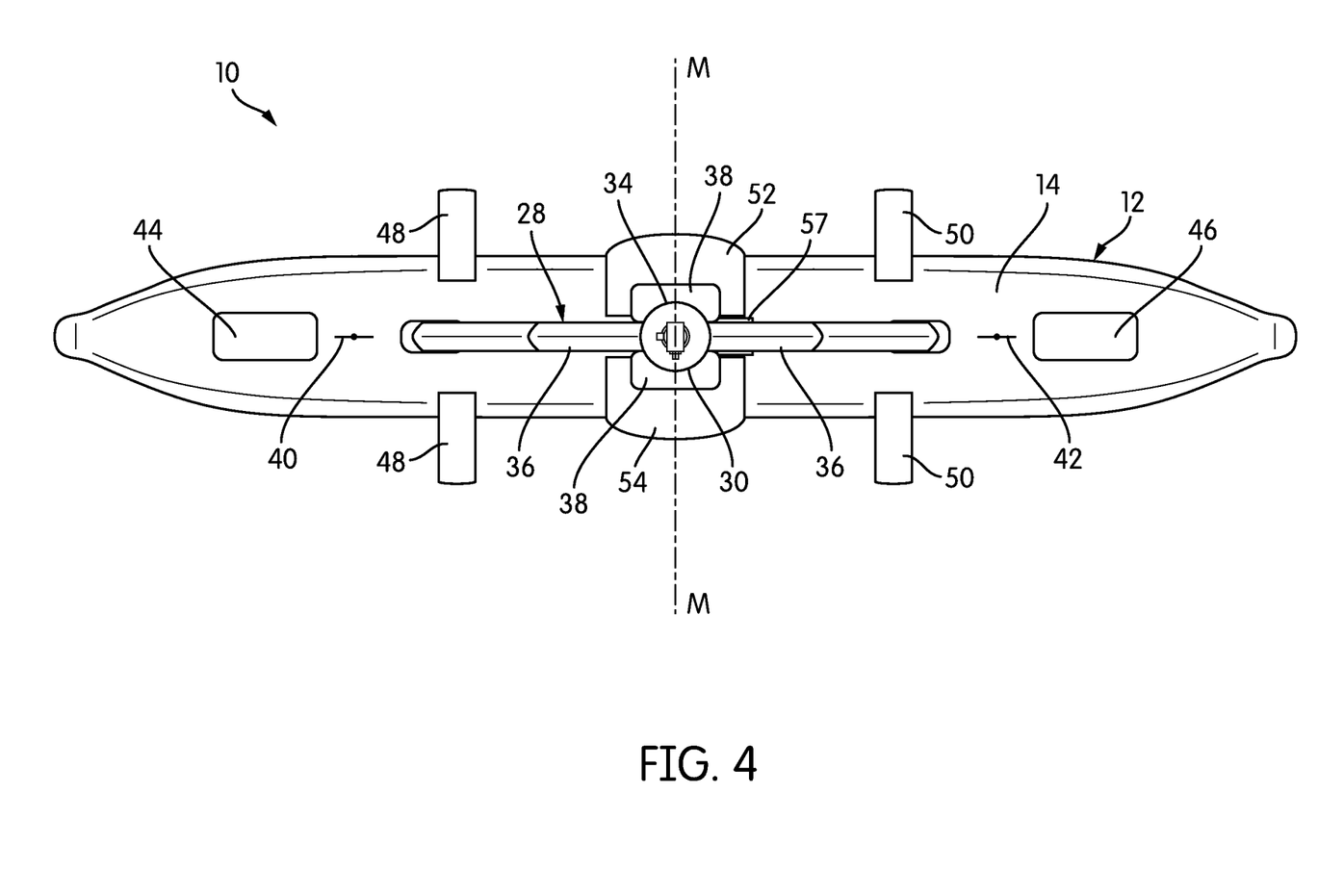
FIG. 4 is a bottom plan view of the vehicle of FIG. 1.

As was described above, the two support struts 36 are mirror images of one another. In fact, the entire vehicle 10 has fore-aft symmetry; specifically, it is symmetrical about the transverse midline of the vehicle 10. The transverse midline, which serves as the axis of symmetry, is indicated by the line M-M in the top and bottom plan views, respectively, of FIGS. 3 and 4. In many cases, the vehicle 10 will also be symmetrical about its longitudinal midline, indicated by line L-L, but fore-aft symmetry about the transverse midline of the vehicle 10 has specific advantages that will be explained below in more detail.

In order to create the fore-aft symmetry of vehicle 10, major systems of the vehicle 10 are duplicated. As shown particularly in the side elevational view of FIG. 2, the vehicle has two steering systems, each of which is independently controllable by remote. In the illustrated embodiment, each steering system includes a rudder 40, 42 and the components used to direct and control the rudder 40, 42. The rudders 40, 42 are placed on opposite ends of the hull 14, arranged symmetrically on either side of the transverse midline M-M. Each rudder 40, 42 is associated with a corresponding propulsion system 44, 46.

The propulsion systems 44, 46 of the illustrated embodiment are also installed on opposite ends of the hull 14, arranged symmetrically on either side of the transverse midline M-M. The propulsion systems 44, 46 are independently driven and may comprise electrically-driven propellers, impellers, rotors, water-thrusters, or other such propulsive devices, along with their controls and associated subsystems. Typically, a small electric motor would be located within the housings of the propulsion systems 44, 46, shrouded by the housings from contact with swimmers. The propulsion systems 44, 46 may be direct-drive systems, in which the motor is connected directly to the propeller, impeller, or other fluid mover, or they may have a drive train connected between the motor and the fluid mover. If a drive train is present, it may act to reduce the rotational speed of the motor and to control the torque applied to the fluid mover. The propulsion systems 44, 46 are reversible as well—both propulsion systems 44, 46 can move water in either of two directions.

While the propulsion systems 44, 46 are independently driven in the vehicle 10, in some embodiments, they may be powered by the same motor or other drive element, and connected to that motor or other drive element by a drive train that uses a clutch or another such element to connect the motor selectively with one propulsion system 44, 46 or the other.

In the vehicle 10, the steering systems and the propulsion systems 44, 46 are separate from one another. However, in some embodiments, the propulsion systems 44, 46 may themselves be steerable, e.g., the propulsion systems 44, 46 may pivot on the hull 14. If the propulsion systems 44, 46 are steerable, the respective steering systems would comprise the components necessary to pivot and steer the propulsion systems 44, 46, and the rudders 40, 42 would be omitted.

Figure 5:
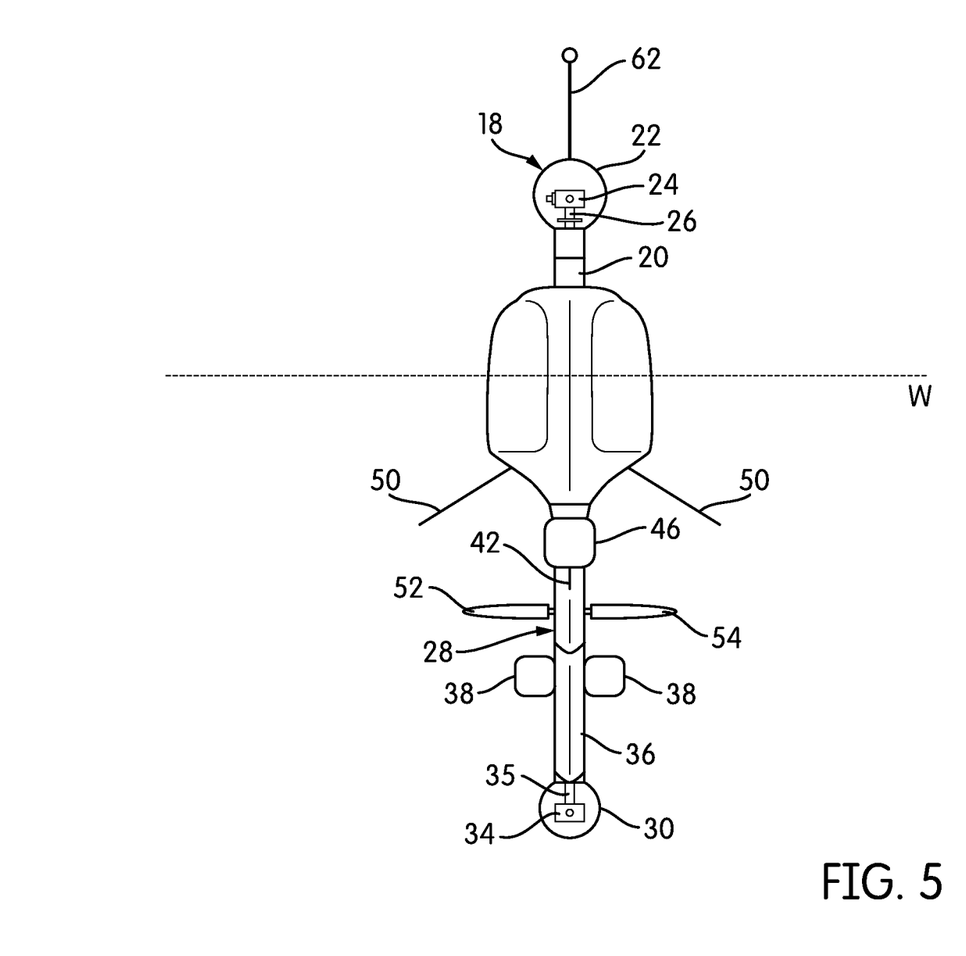
FIG. 5 is an end-elevational view of the vehicle of FIG. 1.

In addition to the propulsion systems 44, 46 and rudders 40, 42, the vehicle 10 has two sets of stabilizers 48, 50 spaced from one another at opposite ends of the vehicle 10, closer to the transverse midline M-M than the propulsion systems 44, 46 or rudders 40, 42. Each set of stabilizers 48, 50 is comprised of a pair of stabilizers 48, 50 that extend outward from the hull 14 below the waterline W. As can be seen in the end elevational view of FIG. 5, the stabilizers 48, 50 have a lateral down-angle of approximately 45°. The stabilizers 48, 50 are optional, but may help to control the trim of the vehicle 10 and to maintain stability. To provide additional trim adjustment, motor-driven pivoting wings 52, 54 may be mounted on the main strut 32 of the underwater camera mount 28. These wings 52, 54 can be pitched up or down. The fore-aft symmetry of the vehicle 10 can also be appreciated from the bottom plan view of FIG. 4.

In some embodiments, the pivoting wings 52, 54 may have their pitch adjust automatically based on data sent from one or more accelerometers in response to pitch movement that exceeds specified limits.

Beyond the propulsion systems 44, 46, as can best be seen in the side-elevational view of FIG. 2, the vehicle may carry a speed impeller 57 which is turned by the flowing water and coupled to a sensor system to determine the speed of the vehicle 10.

As was noted briefly above, the fore-aft symmetry and major-system duplication of the vehicle 10 have specific advantages. First and foremost, the vehicle 10 does not need to execute a traditional rudder-based turn in order to reverse direction. This may be particularly useful when pacing swimmers—when the swimmer makes a turn and begins heading in the opposite direction, the vehicle 10 can simply deactivate one propulsion system 44, 46 and rudder 40, 42 and activate the other in order to move in the opposite direction. This may allow the vehicle 10 to reverse direction faster than a vehicle that executes a conventional rudder-based turn. If it is necessary for the vehicle 10 to execute a conventional turn with its rudders 40, 42 (e.g., to move in a completely different direction), the two sets of propulsion systems 44, 46 and rudders could make that turn faster and more efficient if both sets are activated at the same time and set to augment one another.

All propulsion systems 38, 44, 46 could be used at the same time to propel the vehicle 10. For example, both propulsion systems 44, 46 and auxiliary propulsion and trim systems, like the thrusters 38, could be activated at the same time and set to move water in the same direction, providing the potential of more thrust than one propulsion system 44, 46 alone. To reverse direction, all active propulsion systems 38, 44, 46 could be reversed so that they move water in the opposite direction.

FIG. 2 illustrates the internal systems of the vehicle 10 schematically. The vehicle 10 is electrically powered, and has a set of batteries 56 to provide main power. The batteries 56 would most advantageously be rechargeable, such as lithium rechargeable batteries. While the body 12 may have a sealable hatch to provide access to its internal components or a plurality of smaller, sealable ports to provide access to individual components, the vehicle 10 includes an inductive charging system 58 to charge the batteries 56, so that charging can be accomplished without physical access to the interior of the body 12. In some embodiments, the vehicle 10 may have both an inductive charging system 58 and a direct-connect wired charging system accessible through a port in the hull 14. The batteries 56 are operatively connected (e.g., by appropriate wiring) with the various motors that drive the fluid thrusters 38; the rudders 40, 42; the propulsion systems 44, 46; the wings 52, 54; and the electronic systems.

The vehicle 10 is directed and controlled remotely. Commands are received and data is sent through an onboard communications system 60, which includes a whip antenna 62 that penetrates the upper portion 16 of the body 12. In addition to the main whip antenna 62 and its associated hardware, which would primarily be used to transmit and receive control signals to control the speed and direction of the vehicle 10, the communications system 60 would typically include other transceivers for transmitting in other frequency bands for other purposes, e.g., for transmitting video and other data. Overall, the vehicle 10 may be adapted to communicate using WiFi, BLUETOOTH™, and other common data-communication protocols in order to communicate video and other types of data with an external station, which will be described below in more detail. Each transceiver may have a dedicated single antenna or an array of antennas in addition to the whip antenna 62 shown in the figures. These antennas may be internal to the body 12 or external.

The communications system 60 may be adapted to receive speed and directional control signals via transmission over a dedicated channel. More specifically, the communications system 60 and its main whip antenna 62 may be adapted to communicate using analog or digital communication protocols in a frequency band used for consumer electronics. For example, in the United States, the communications system 60 may be adapted to receive speed and directional control signals in the 27 MHz, 49 MHz, 72 MHz, or 75 MHz frequency bands.

The communications system 60 may also be equipped to receive speed and directional signals over a shared communications channel. For example, speed and directional signals and video and data communication could all be transmitted and received using a digital communications protocol, like WiFi or Bluetooth.

If the communications system 60 is adapted to receive speed and directional signals over a shared communications channel, particularly one that operates in the gigahertz frequency range, like WiFi or Bluetooth, then a whip antenna 62 may be unnecessary, and the necessary antennas may be disposed within the body 12 of the vehicle 10, assuming that the body 12 of the vehicle is transparent to RF signals in that frequency range.

The communications system 60 and other electronic components are controlled by a control unit 64, which would typically be an embedded computer system. The control unit 64 would typically include a microprocessor, an application-specific integrated circuit (ASIC), a field-programmable gate array (FPGA) or another such control circuit. The control unit 64 would typically also have onboard random access memory (RAM), onboard permanent storage (typically a solid-state drive, although a traditional hard disk drive may be used in some embodiments), and onboard communication ports, such as universal serial bus (USB) ports. The control unit 64 would typically communicate with the cameras 24, 34 via wired connections, such as USB connections.

While the communications system 60 is described and illustrated separately from the control unit 64 for ease of description and illustration, the signal processing components of the communications system 60 may be integrated into the control unit 64, i.e., they may be physically present on the same printed circuit board (PCB) that houses the control unit 64.

The control unit 64 would typically receive video from the cameras 24, 34 for real-time transmission to an external station. (The term "real-time," as used here, refers to data transmission that occurs as the data is collected.) In some cases, the control unit 64 may be equipped to alter the video as it is received, e.g., to change color video to black-and-white, to aggregate multiple video streams from the cameras 24, 34 into a single frame, or to perform some noise filtration tasks. However, in most cases, the control unit 64 will simply collect video and transmit it in real time, buffer it for transmission, or save it to storage for later retrieval. The actual frequencies that are used for communication may be altered by the user, within frequency bands specified by the relevant authorities.

In some embodiments, the control unit 64 may measure the signal strength or bandwidth of the primary means of data transmission (e.g., the strength of a WiFi signal) and determine, based on the signal strength or bandwidth, whether data should be sent in real time or whether it should be stored for later retrieval. As another option, the control unit 64 may alter the video from the cameras 24, 34 in real time to downgrade the video resolution and send lower-bandwidth, lower-resolution video in real time, with the full, high-resolution video stored to disk for later retrieval and analysis. Of course, in some cases, each observation pod 22, 30 may include both a high-resolution camera and a low-resolution camera.

If necessary, the interior of the vehicle 10 may contain motors 66, 68 for moving elements like the cameras 24, 34 and the rudders 40, 42. Those motors 66, 68 may be connected to the various elements they drive by respective power trains, which may comprise any elements capable of transmitting mechanical power. The motors 66, 68 would typically also be in communication with the control unit 64. Control of the motors 66, 68 may be simple: the control unit 64 may switch them on and off for certain periods of time in order to achieve necessary functions, or an analog control signal may be provided. However, the motors 66, 68 may be stepper motors or other such motors that are responsive to digital control signals, and the control unit 64 may control them by use of digital signals.

As was noted briefly above, the vehicle 10 may have an additional suite of onboard sensors. For example, the vehicle 10 may have an ultrasonic transducer system 70 with an emitter-receiver located at each end, in order to prevent collision with the walls of a pool. The ultrasonic transducer system 70 would be in communication with the control unit 64 to establish a signal that causes the vehicle 10 to either cut power or engage the opposite rudder 40, 42 and propulsion system 44, 46 so as to avoid collisions. Alternatively, upon receiving a signal that a collision is imminent, the control unit 64 could be programmed to reverse all propulsion systems 38, 44, 46 and, if present, all rudders 40, 42 as well. Additionally, an underwater speaker 72 may be installed within the vehicle 10 so that a coach or another individual can provide oral instructions or encouragement to a swimmer during a session.

As FIG. 2 illustrates, the vehicle 10 communicates with one or both of two external elements. A handheld controller 74 would typically be used to send analog or digital control signals to the vehicle 10 to control its speed and direction. The handheld controller 74 may also have some control over the other functions of the vehicle 10, e.g., to control camera position if the cameras 24, 34 are motorized and remotely controllable, to start or stop video transmission, or to toggle between video modes and options. Communication between the vehicle 10 and the controller 74 would typically be direct, RF communication. The handheld controller 74 may have a small video display capable of showing video from the cameras 24, 34.

The other external element shown in FIG. 2 is a coach's station 76, which may also be referred to as a data review station 76. Communication between the vehicle 10 and the coach's station 76 may be either direct or through a communications network, such as a WiFi network or the Internet at large. The coach's station 76 receives all video streams and other information from the vehicle 10. The coach's station 76 would typically be a computing device. For example, the coach's station 76 may be a desktop computer or a laptop computer. In some cases, however, the coach's station 76 may be a tablet computer or another type of device. The coach's station 76 allows a coach, or another interested individual, to view all of the video from the vehicle 10.

However, the coach's station 76 may also be used to process the data from the vehicle 10 before or during viewing. For example, although the cameras 24, 34 may be stabilized by their mounts, camera-stabilized video capture will not necessarily hold the images of the swimmer completely steady, especially in waves that are generated during turns. Thus, the coach's station 76 may employ digital video stabilization techniques. The coach's station 76 may also extract timing data from the video streams and overlay timing data, or other useful information, on the video itself before display. Displayed data may be adjusted in size, font, color, contrast, and position. Beyond display, the coach's station 76 may receive synchronized timing and speed data.

In a typical swim session, an assistant would control the speed and direction of the vehicle 10 with the handheld controller 74, while watching the vehicle 10 and the swimmer that the vehicle follows. Meanwhile, a coach would use the coach's station 76 to study the video that is generated by the vehicle 10 and, if a speaker 72 is installed, to provide real-time audio feedback. However, in some cases, the coach's station 76 may assume full control over the vehicle 10. The coach's station 76 may be equipped to transmit and receive over a specific communications channel used for speed and direction control signals (e.g., an analog communications channel), or, if the vehicle 10 is so equipped, the coach's station 76 may transmit those control signals over a shared data channel, using a communications protocol such as WiFi or BLUETOOTH™.

In some embodiments, there may be a second controller that can be used by a coach or another type of supervisory user to exert privileged control over the vehicle 10. The supervisory controller would have privileged access to the functions of the vehicle 10, and its commands would take precedence over any normal controller 74 or controllers 74 that may be used.

In use, the position of the vehicle 10 relative to any particular swimmer will depend on the circumstances. In some cases, the vehicle 10 may observe the swimmer from an adjacent lane. Because the camera mounts 18, 28 extend above and below the waterline W, lane markers and other elements that may be at or close to the surface would not typically be an obstruction to the view of the cameras 24, 34.

While the invention has been described with respect to certain embodiments, the description is intended to be exemplary, rather than limiting. Modifications and changes may be made within the scope of the invention, which is defined by the appended claims.

What is claimed is:

1. A vehicle, comprising:
   a hull;
   an above-water camera mount mounted on and extending upwardly from the hull, the above-water camera mount having one or more above-water cameras;
   a below-water camera mount mounted on and extending downwardly from the hull, the below-water camera mount having
      a below-water vertically-extending strut,
      an observation pod at a distal end of the below-water strut,
      one or more below-water cameras disposed within the observation pod, and
      a pair of support struts that are mounted on the hull and extend downwardly below water, joining and supporting the below-water vertically-extending strut;
   a first propulsion system attached to the hull, the first propulsion system adapted to drive the vehicle through water;
   a first steering system attached to the hull in association with the first propulsion system; and
   a communications system adapted to (1) receive control signals relating to speed and direction of the vehicle, and (2) transmit image or video data from the one or more above-water cameras and the one or more below-water cameras; and
   a control unit adapted to control the first propulsion system and the first steering system in accordance with the control signals and to control transmission of the image or video data.

2. The vehicle of claim 1, wherein the hull is symmetrical about a transverse midline.

3. The vehicle of claim 2, wherein the first propulsion system and the first steering system are disposed proximate to a first end of the hull facing a first direction.

4. The vehicle of claim 3, further comprising:
   a second propulsion system attached to the hull, the second propulsion system adapted to drive the vehicle through water; and a second steering system attached to the hull in association with the second propulsion system.

5. The vehicle of claim 4, wherein the second propulsion system and the second steering system are disposed proximate to a second end of the hull facing a second direction opposite the first direction.

6. The vehicle of claim 1, wherein the above-water camera mount comprises:
an above-water vertically-extending strut;
an observation pod at a distal end of the above-water strut;
wherein the one or more above-water cameras are disposed within the observation pod.

7. The vehicle of claim 1, wherein the below-water vertically-extending strut telescopes.

8. The vehicle of claim 7, wherein each of the pair of support struts telescopes.

9. The vehicle of claim 1, wherein the pair of support struts are aligned along a longitudinal axis of the vehicle.

10. The vehicle of claim 1, further comprising trim adjustment wings mounted on the below-water camera mount.

11. A vehicle, comprising:
a hull that is symmetrical about a transverse midline of the vehicle and has respective first and second ends that are spaced from one another and are mirror images of one another;
an above-water camera mount mounted on and extending upwardly from the hull, the above-water camera mount having one or more above-water cameras;
a below-water camera mount mounted on and extending downwardly from the hull, the below-water camera mount having
a below-water vertically-extending strut,
an observation pod at a distal end of the below-water strut,
one or more below-water cameras disposed within the observation pod, and
a pair of support struts that are mounted on the hull and extend downwardly below water, joining and supporting the below-water vertically-extending strut;
first and second propulsion systems attached to the hull proximate to the first and second ends, respectively, symmetrically about the transverse midline of the hull, the first and second propulsion systems adapted to drive the vehicle through water;
first and second steering systems attached to the hull symmetrically about the transverse midline of the hull in association with the first and second propulsion systems, respectively;
a communications system adapted to (1) receive control signals relating to speed and direction of the vehicle, and (2) transmit image or video data from the one or more above-water cameras and the one or more below-water cameras; and
a control unit adapted to control the first and second propulsion systems and the first and second steering systems in accordance with the control signals and to control transmission of the image or video data.

12. The vehicle of claim 11, wherein the above-water camera mount comprises:
an above-water vertically-extending strut;
an observation pod at a distal end of the above-water strut;
wherein the one or more above-water cameras are disposed within the observation pod.

13. A system for observing swimmers, comprising:
a remotely-controlled observation vehicle including a hull,
an above-water camera mount mounted on and extending upwardly from the hull, the above-water camera mount having one or more above-water cameras,
a below-water camera mount mounted on and extending downwardly from the hull, the below-water camera mount having
a below-water vertically-extending strut,
an observation pod at a distal end of the below-water strut,
one or more below-water cameras disposed within the observation pod, and
a pair of support struts that are mounted on the hull and extend downwardly below water, joining and supporting the below-water vertically-extending strut,
a first propulsion system attached to the hull, the first propulsion system adapted to drive the vehicle through water,
a first steering system attached to the hull in association with the first propulsion system, and
a communications system adapted to (1) receive control signals relating to speed and direction of the vehicle, and (2) transmit image or video data from the one or more above-water cameras and the one or more below-water cameras, and
a control unit adapted to control the first propulsion system and the first steering system in accordance with the control signals and to control transmission of the image or video data;
a controller adapted to provide the control signals relating to the speed and the direction of the vehicle; and
a data review station adapted to receive the image or video data.

14. The system of claim 13, wherein the controller is adapted to transmit the control signals through a dedicated communications channel.

15. The system of claim 13, wherein the controller is adapted to transmit the control signals through a shared communications channel.

16. The system of claim 15, wherein the data review station receives the image or video data through the shared communications channel.

17. The system of claim 16, wherein the shared communications channel uses WiFi or BLUETOOTH™ communication protocols.

18. The system of claim 13, wherein the data review station is adapted to display the image or video data.

19. The system of claim 18, wherein the data review station is adapted to display the image or video data with timing data.

* * * * *